US012775125B2

(12) United States Patent
Mizuno et al.

(10) Patent No.: US 12,775,125 B2
(45) Date of Patent: Oct. 27, 2026

(54) METASURFACE REFLECTOR, PROJECTION DEVICE, AND NEAR-EYE WEARABLE DEVICE

(71) Applicant: TDK CORPORATION, Tokyo (JP)

(72) Inventors: Tomohito Mizuno, Tokyo (JP); Hideaki Fukuzawa, Tokyo (JP); Tetsuya Shibata, Tokyo (JP); Tsuyoshi Komaki, Tokyo (JP); Takeshi Nojiri, Tokyo (JP)

(73) Assignee: TDK CORPORATION, Tokyo (JP)

( * ) Notice: Subject to any disclaimer, the term of this patent is extended or adjusted under 35 U.S.C. 154(b) by 202 days.

(21) Appl. No.: 18/891,926

(22) Filed: Sep. 20, 2024

(65) Prior Publication Data

US 2025/0102713 A1 Mar. 27, 2025

(30) Foreign Application Priority Data

Sep. 25, 2023 (JP) ................................ 2023-160135

(51) Int. Cl.
*G02B 5/08* (2006.01)
*G02B 1/00* (2006.01)
(Continued)

(52) U.S. Cl.
CPC ........... *G02B 5/0875* (2013.01); *G02B 1/002* (2013.01); *G02B 27/0172* (2013.01);
(Continued)

(58) Field of Classification Search
CPC .. G02B 5/0875; G02B 1/002; G02B 27/0172; G02B 26/105; G02B 2027/002; G02B 2027/0178; G02B 1/00; G02B 5/0816; G02B 5/085; G02B 5/18; G02B 5/1809; G02B 5/1814; G02B 5/1828;
(Continued)

(56) References Cited

U.S. PATENT DOCUMENTS

2014/0085693 A1* 3/2014 Mosallaei .............. G02B 1/002 359/107
2025/0102705 A1* 3/2025 Mizuno .................. G02B 1/002
(Continued)

OTHER PUBLICATIONS

Zhiwei Li et al., "Continuous metasurface for high-performance anomalous reflection", Applied Physics Express, The Japan Society of Applied Physics, (2014), vol. 7, pp. 112001-1-112001-3.

*Primary Examiner* — Arnel C Lavarias
(74) *Attorney, Agent, or Firm* — Oliff PLC

(57) ABSTRACT

A metasurface reflector includes: a first metal layer and a second metal layer stacked in a first direction; and a dielectric layer provided between the first metal layer and the second metal layer in the first direction. The dielectric layer includes a main surface on which the second metal layer is provided. The metasurface reflector is divided into a plurality of unit regions arranged in a second direction along the main surface and in a third direction along the main surface and intersecting the second direction. The second metal layer includes metal units respectively provided in all or some of the plurality of unit regions. Lengths of metal units, which are arranged in the second direction and set for a same wavelength among the metal units, in the second direction are different from each other.

14 Claims, 11 Drawing Sheets

(51) Int. Cl.
*G02B 27/01* (2006.01)
*G02B 26/10* (2006.01)

(52) U.S. Cl.
CPC .... *G02B 26/105* (2013.01); *G02B 2027/0112* (2013.01); *G02B 2027/0178* (2013.01)

(58) Field of Classification Search
CPC .. G02B 5/1861; G02B 27/01; G02B 27/0101; G02B 27/017; G02B 27/42; G02B 27/4233; G02B 27/425; G02B 27/4294
USPC ......... 359/838, 13, 558, 566, 569, 570, 572, 359/573, 574, 575, 576, 850, 8, 71, 883, 359/884; 353/28, 39, 98, 99
See application file for complete search history.

(56) References Cited

U.S. PATENT DOCUMENTS

| | | | | |
|---|---|---|---|---|
| 2025/0273867 | A1* | 8/2025 | Nakamura | H01Q 15/0026 |
| 2025/0284127 | A1* | 9/2025 | Nojiri | G02B 1/002 |
| 2025/0309555 | A1* | 10/2025 | Kambara | H01Q 15/18 |

* cited by examiner

METASURFACE REFLECTOR, PROJECTION DEVICE, AND NEAR-EYE WEARABLE DEVICE

CROSS-REFERENCE TO RELATED APPLICATION

This application claims the benefit of priority from Japanese Patent Application No. 2023-160135 filed with the Japan Patent Office on Sep. 25, 2023, the entire contents of which are incorporated herein by reference.

TECHNICAL FIELD

The present disclosure relates to a metasurface reflector, a projection device, and a near-eye wearable device.

BACKGROUND

Reflectors using metasurface technology are known. For example, Non-Patent Document 1 (Zhiwei Li, Lirong Huang, Kun Lu, Yali Sun, Li Min, "Continuous metasurface for high-performance anomalous reflection", Applied Physics Express, The Japan Society of Applied Physics, Oct. 7, 2014, Volume 7) describes a metasurface reflector in which a plurality of trapezoidal antennas is two dimensionally arranged.

SUMMARY

In the metasurface reflector described in Non-Patent Document 1, the trapezoidal antennas having the same shape are regularly arranged two dimensionally. Therefore, the plurality of trapezoidal antennas arranged in the vertical direction and the horizontal direction have a periodicity. Due to this periodicity, unnecessary scattered light may occur.

The present disclosure describes a metasurface reflector, a projection device, and a near-eye wearable device capable of reducing unnecessary scattered light.

A metasurface reflector according to one aspect of the present disclosure includes: a first metal layer and a second metal layer stacked in a first direction; and a dielectric layer provided between the first metal layer and the second metal layer in the first direction. The dielectric layer includes a main surface on which the second metal layer is provided. The metasurface reflector is divided into a plurality of unit regions arranged in a second direction along the main surface and in a third direction along the main surface and intersecting the second direction. The second metal layer includes metal units respectively provided in all or some of the plurality of unit regions. Lengths of metal units, which are arranged in the second direction and set for a same wavelength among the metal units, in the second direction are different from each other.

In the metasurface reflector, the lengths in the second direction of metal units, which are arranged in the second direction and set for the same wavelength among the metal units, are different from each other. For example, when the metal units provided in the unit regions within a certain range have the same length in the second direction, the metal units having the same length are arranged in the second direction, and the periodicity of the metal units occurs in the second direction. On the other hand, in the above-described metasurface reflector, since the periodicity of the metal units is less likely to occur in the second direction, it is possible to reduce the possibility that unnecessary scattered light occurs in the second direction. As a result, unnecessary scattered light can be reduced.

Each metal unit of the metal units may be configured such that a phase change amount of reflected light linearly changes from a first end to a second end in the second direction of a unit region in which the metal unit is provided. A length of the metal unit in the second direction may be determined by a wavelength to be reflected, and an incident angle and a reflection angle corresponding to a position of the unit region in which the metal unit is provided. In this case, a plane wave having the gradient of the function indicating the relationship between the position in the second direction and the phase change amount of the reflected light as the wave vector can be generated. Therefore, by adjusting the length of the metal unit in the second direction, a desired reflection angle can be obtained with respect to the incident angle corresponding to the position of the unit region. Accordingly, since the reflection angles smoothly change in the second direction, it is possible to suppress the light bleeding.

Each of the metal units may be a metal body having a trapezoidal shape when viewed from the first direction. In this case, the structure of the metal unit can be simplified as compared with the case where the metal unit is composed of a plurality of metal bodies. Accordingly, the manufacturing of the metasurface reflector can be facilitated.

A length of the metal body in the second direction may be 500 nm or more and 2500 nm or less. A length of the metal body in the first direction may be 10 nm or more and 100 nm or less. A length of a short side of the metal body may be 10 nm or more and 200 nm or less. A length of a long side of the metal body may be larger than the length of the short side and may be 100 nm or more and 500 nm or less. In this case, the reflection efficiency for visible light can be enhanced.

The plurality of unit regions may include reflection regions each provided with one of the metal units and missing regions each without any metal unit. The reflection regions and the missing regions may be arranged irregularly in an arrangement in the third direction. In this case, the metal units are arranged irregularly in the third direction. Accordingly, since the periodicity of the metal units is less likely to occur in the third direction, it is possible to reduce the possibility that unnecessary scattered light occurs in the third direction. As a result, unnecessary scattered light can be further reduced.

The reflection regions and the missing regions may be arranged irregularly in an arrangement in the second direction. In this case, the metal units are arranged irregularly in the second direction. Accordingly, since the periodicity of the metal units is even less likely to occur in the second direction, it is possible to further reduce the possibility that unnecessary scattered light occurs in the second direction. As a result, unnecessary scattered light can be further reduced.

A number of the missing regions may be 10% or more and 20% or less of a total number of unit regions included in the metasurface reflector. In this case, it is possible to reduce unnecessary scattered light while suppressing a decrease in the intensity of the reflected light.

The plurality of unit regions may include first unit regions for a red component, second unit regions for a green component, and third unit regions for a blue component. The first unit regions, the second unit regions, and the third unit regions may be arranged repeatedly one by one in that order in the second direction and the third direction. Lengths of the metal units, which are provided in the first unit regions arranged in the second direction, in the second direction may be different from each other. Lengths of the metal units, which are provided in the second unit regions arranged in the second direction, in the second direction may be different from each other. Lengths of the metal units, which are provided in the third unit regions arranged in the second direction, in the second direction may be different from each other. The reflection angle by the metal unit varies with the wavelength. Therefore, the laser light having a plurality of wavelength components may not be reflected at a desired reflection angle. In the above configuration, since the first unit regions for the red component, the second unit regions for the green component, and the third unit regions for the blue component are provided, each component can be reflected at the desired reflection angle. Further, since the lengths of the metal units for the same wavelength component are different from each other, the periodicity of the metal units is less likely to occur in the second direction. Accordingly, it is possible to reduce the possibility that unnecessary scattered light occurs in the second direction. As a result, it is possible to reflect each component of the laser light at the desired reflection angle while reducing unnecessary scattered light.

The second metal layer may be made of a metal containing at least one element selected from a group consisting of silver, aluminum, copper, and gold. In this case, the second metal layer having a relatively high reflectance and a relatively high electric conductivity can be obtained. Accordingly, the electromagnetic resonance between the first metal layer and the second metal layer can be strengthened, and the reflection efficiency can be enhanced.

The dielectric layer may be made of a material transparent in a visible light region. In this case, since the absorption rate of visible light in the dielectric layer is suppressed, the reflection efficiency for visible light can be enhanced.

The dielectric layer may be made of a compound selected from a group consisting of silicon oxide, titanium oxide, magnesium oxide, and aluminum oxide. In this case, the dielectric layer having a dielectric constant that does not interfere with the electromagnetic action can be obtained. Accordingly, the electromagnetic resonance between the first metal layer and the second metal layer can be strengthened, and the reflection efficiency can be enhanced.

A length of the dielectric layer in the first direction may be 10 nm or more and 100 nm or less. A length of the first metal layer in the first direction may be 50 nm or more and 1000 nm or less. In this case, the possibility that the dielectric layer interferes with the electromagnetic action can be reduced, and the possibility that the laser light passes through the first metal layer can be reduced. Accordingly, the reflection efficiency can be enhanced.

A projection device according to another aspect of the present disclosure is a device mounted on a near-eye wearable device. The projection device includes: a light source that emits laser light; a movable mirror that performs scanning with the laser light; and the above-described metasurface reflector that reflects the laser light having passed through the movable mirror to cause a user wearing the near-eye wearable device to visually recognize an image. In the projection device as well, unnecessary scattered light can be reduced.

A near-eye wearable device according to still another aspect of the present disclosure includes: the above-described projection device; and a lens provided with the metasurface reflector. In the near-eye wearable device as well, unnecessary scattered light can be reduced.

According to each aspect and each embodiment of the present disclosure, unnecessary scattered light can be reduced.

DETAILED DESCRIPTION

Figure 1:
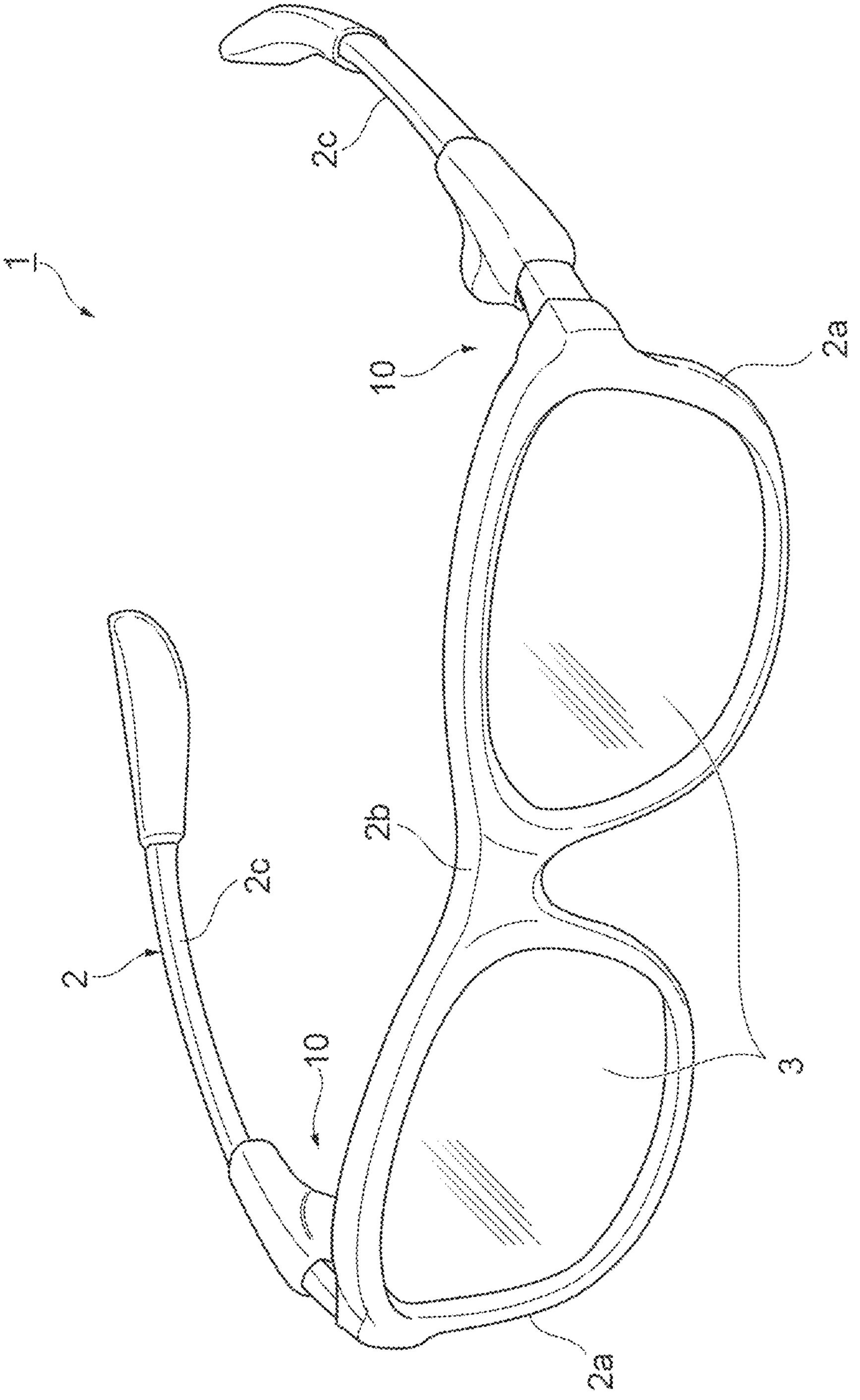
FIG. 1 is a perspective view showing an appearance of a near-eye wearable device to which a metasurface reflector according to an embodiment is applied.

Hereinafter, embodiments of the present disclosure will be described in detail with reference to the drawings. In the description of the drawings, the same elements are denoted by the same reference numerals, and redundant description will be omitted. In each figure, an XYZ coordinate system may be shown. The Y-axis direction (third direction) is a direction intersecting (for example, orthogonal to) the X-axis direction (second direction) and the Z-axis direction (first direction). The Z-axis direction is a direction intersecting (for example, orthogonal to) the X-axis direction and the Y-axis direction. In the present specification, the numerical ranges indicated by "to" represent ranges that include the values described before and after "to" as the minimum and maximum values, respectively. The individually described upper and lower limit values can be combined arbitrarily.

A near-eye wearable device to which a metasurface reflector according to an embodiment is applied will be described with reference to FIG. 1. FIG. 1 is a perspective view showing an appearance of a near-eye wearable device to which a metasurface reflector according to an embodiment is applied. The near-eye wearable device 1 shown in FIG. 1 is a device for superimposing an image on the field of view of the real world. The near-eye wearable device 1 is, for example, a head-mounted device, and may take the form of an eyeglass type, a goggle type, a hat type, a helmet type, or the like. Examples of the near-eye wearable device 1 include smart glasses such as augmented reality (AR) glasses, and mixed reality (MR) glasses. The near-eye wearable device 1 includes a frame 2, a lens 3, and a projection device 10.

The frame 2 includes a pair of rims 2*a*, a bridge 2*b*, and a pair of temples 2*c*. The rim 2*a* is a portion for holding the lens 3. The bridge 2*b* is a portion connecting the pair of rims 2*a*. The temple 2*c* extends from the rim 2*a* and is a portion to be put on an ear of a user. The frame 2 may be a rimless frame. The lens 3 has an inner surface 3*a* (refer to FIG. 2) facing an eyeball E (refer to FIG. 6) of a user wearing the near-eye wearable device 1.

In the present embodiment, the projection device 10 is a device for directly projecting (drawing) an image onto a retina RE (refer to FIG. 6) of a user wearing the near-eye wearable device 1. The projection device 10 is mounted on the near-eye wearable device 1. In the present embodiment, the near-eye wearable device 1 includes two projection devices 10 in order to project an image onto both the right and left retinas RE, but may include only one of the projection devices 10.

Figure 2:
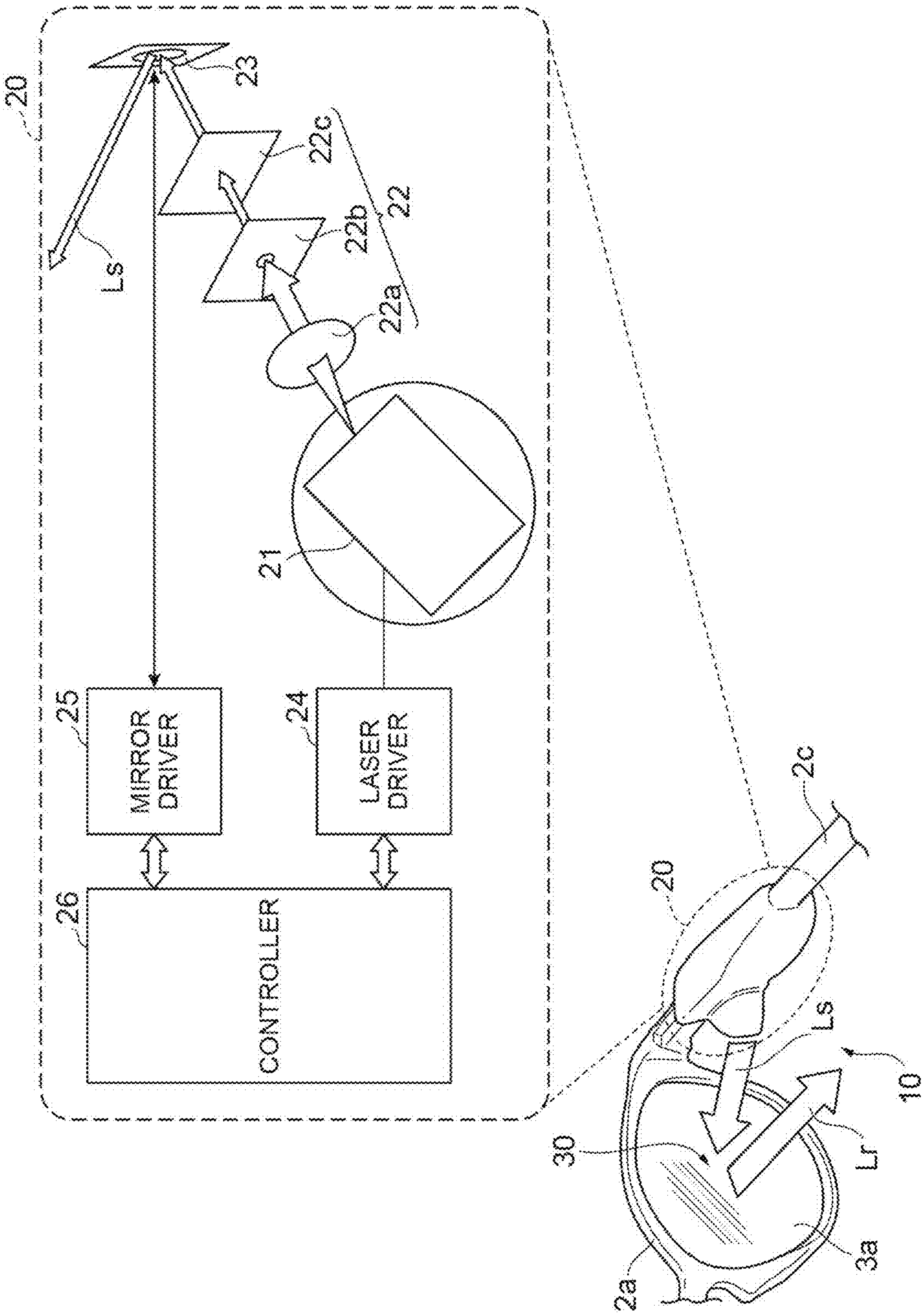
FIG. 2 is a configuration diagram schematically showing the projection device shown in FIG. 1.

Next, the projection device 10 will be described in detail with reference to FIG. 2. FIG. 2 is a configuration diagram schematically showing the projection device shown in FIG. 1. As shown in FIG. 2, the projection device 10 includes an optical engine 20 and a metasurface reflector 30.

The optical engine 20 is a device that generates laser light Ls having a color and intensity corresponding to a pixel of an image to be projected onto the retina RE and emits the laser light Ls to the metasurface reflector 30. The optical engine 20 is mounted on each temple 2*c*. The optical engine 20 includes a light source unit 21 (light source), optical components 22, a movable mirror 23, a laser driver 24, a mirror driver 25, and a controller 26.

The light source unit 21 emits laser light. As the light source unit 21, for example, a full-color laser module is used. The light source unit 21 includes a red laser diode, a green laser diode, a blue laser diode, and a multiplexer that multiplexes laser lights emitted from laser diodes into one laser light. The light source unit 21 emits the multiplexed laser light. The multiplexed laser light contains a component having a wavelength of red (red component), a component having a wavelength of green (green component), and a component having a wavelength of blue (blue component). The light source unit 21 emits laser light having a color and intensity corresponding to a pixel of an image to be projected onto the retina RE.

The optical components 22 are components that optically process the laser light emitted from the light source unit 21. In the present embodiment, the optical components 22 include a collimator lens 22*a*, a slit 22*b*, and a neutral density filter 22*c*. The collimator lens 22*a*, the slit 22*b*, and the neutral density filter 22*c* are arranged in this order along the optical path of the laser light. The optical components 22 may have other configurations.

The movable mirror 23 is an optical component for performing scanning with the laser light Ls. The movable mirror 23 is provided in a direction in which the laser light processed by the optical components 22 is emitted. The movable mirror 23 is configured to be swingable about an axis extending in the horizontal direction (X-axis direction) of the lens 3 and about an axis extending in the vertical direction (Y-axis direction) of the lens 3, for example, and reflects the laser light while changing the angle in the X-axis direction and the Y-axis direction. As the movable mirror 23, for example, a micro electro mechanical systems (MEMS) mirror is used.

The laser driver 24 is a driving circuit for driving the light source unit 21. The laser driver 24 drives the light source unit 21 based on, for example, the intensity of the laser light and the temperature of the light source unit 21. The mirror driver 25 is a driving circuit for driving the movable mirror 23. The mirror driver 25 swings the movable mirror 23 within a predetermined angle range and at a predetermined timing. The controller 26 is a device for controlling the laser driver 24 and the mirror driver 25.

In the optical engine 20, laser light having a color and intensity corresponding to a pixel of an image to be projected onto the retina RE is emitted from the light source unit 21, passes through the optical components 22, and is reflected by the movable mirror 23. The laser light reflected by the movable mirror 23 is emitted to the metasurface reflector 30 as the laser light Ls.

The metasurface reflector 30 is an optical component that reflects the laser light Ls that has passed through the movable mirror 23 to cause a user wearing the near-eye wearable device 1 to visually recognize an image. No image is displayed on the metasurface reflector 30. The metasurface reflector 30 is provided on the inner surface 3*a* of the lens 3.

Figure 3:
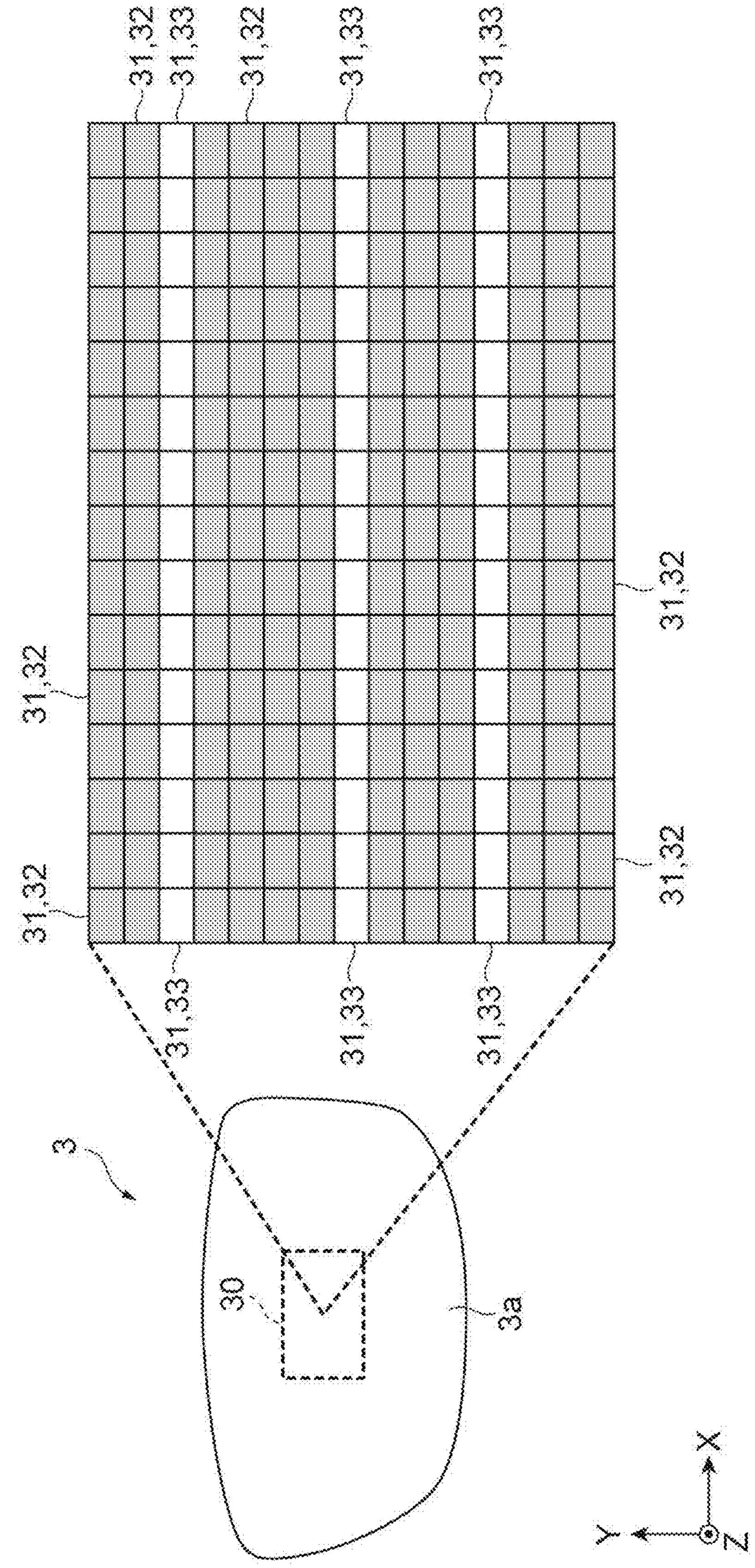
FIG. 3 is an enlarged view of the metasurface reflector shown in FIG. 2.
Figure 4:
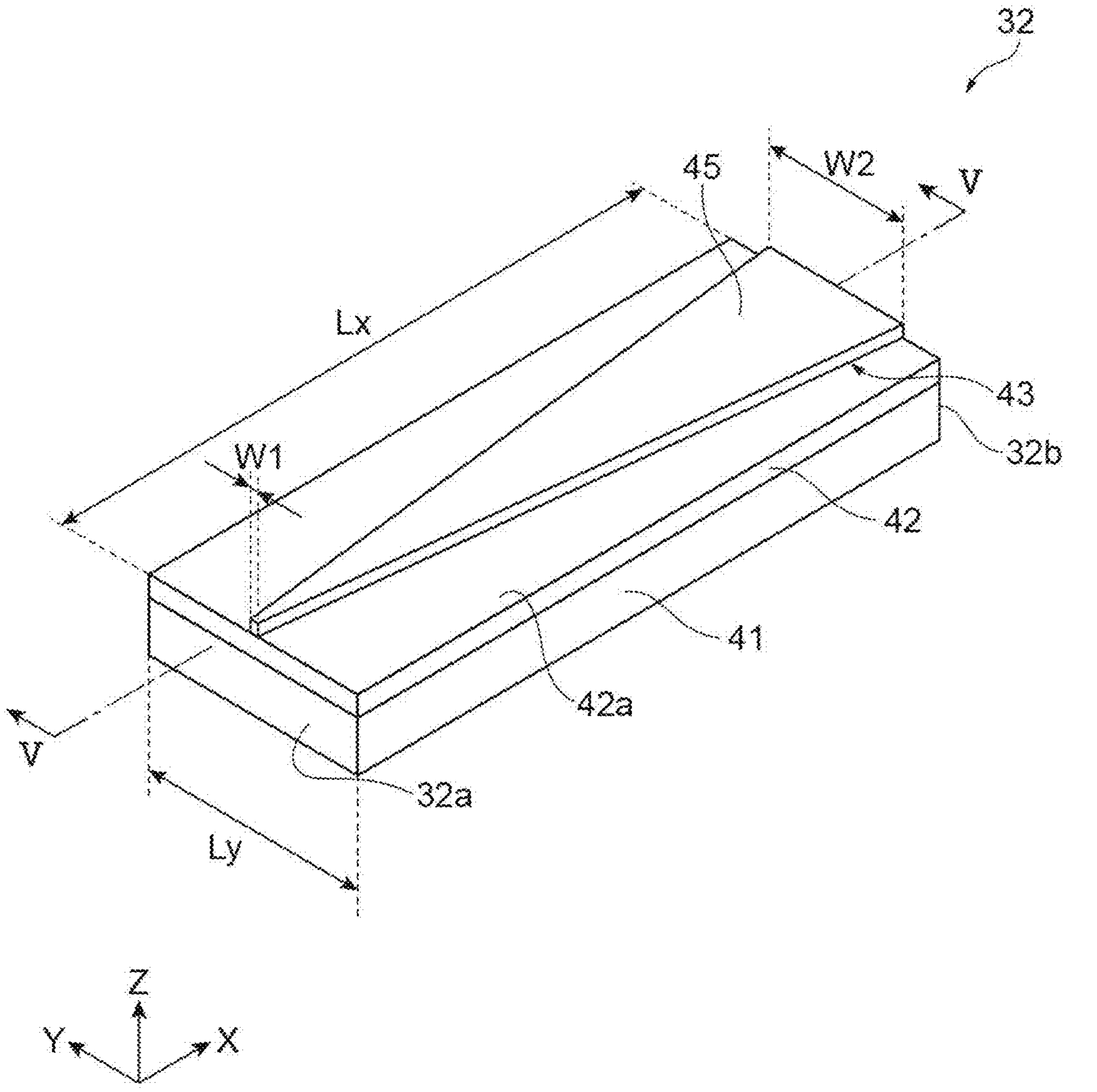
FIG. 4 is a perspective view schematically showing the reflection region shown in FIG. 3.
Figure 5:
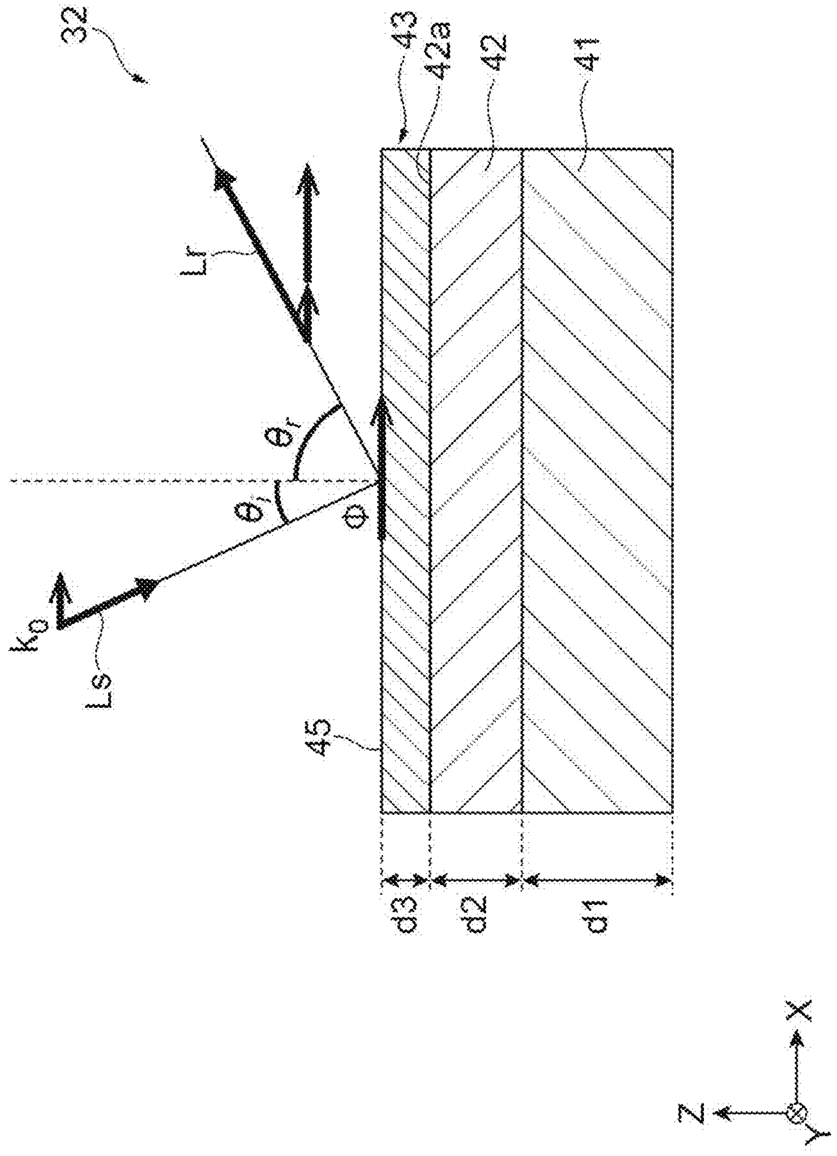
FIG. 5 is a cross-sectional view taken along the line V-V of FIG. 4.

Next, the configuration of the metasurface reflector 30 will be described with reference to FIGS. 3 to 5. FIG. 3 is an enlarged view of the metasurface reflector shown in FIG. 2. FIG. 4 is a perspective view schematically showing the reflection region shown in FIG. 3. FIG. 5 is a cross-sectional view taken along the line V-V of FIG. 4.

As shown in FIG. 3, the metasurface reflector 30 is divided into a plurality of unit regions 31. The plurality of unit regions 31 is provided along the inner surface 3*a* of the lens 3. The plurality of unit regions 31 is arranged in a two-dimensional array in the horizontal direction (X-axis direction) and the vertical direction (Y-axis direction) of the lens 3. The plurality of unit regions 31 includes reflection regions 32 and missing regions 33. Each of the reflection regions 32 is a unit region 31 in which a metal unit 45 described later is provided. Each of the missing regions 33 is a unit region 31 in which any metal unit 45 is not provided.

In the arrangement in the Y-axis direction, the reflection regions 32 and the missing regions 33 are arranged irregularly. In other words, in the arrangement in the Y-axis direction, the reflection regions 32 and the missing regions 33 are distributed in a non-uniform sequence.

Hereinafter, the arrangement in the X-axis direction may be referred to as a "row", and the arrangement in the Y-axis direction may be referred to as a "column". The number of missing regions 33 is, for example, 10% to 20% of the total number of unit regions 31 included in the metasurface reflector 30. In the present embodiment, all the unit regions 31 in the arrangement (one row) in the X-axis direction are set either as the reflection regions 32 or the missing regions 33. For example, the row of the row number corresponding to the random value obtained by the random function is determined as a row of the missing regions 33.

As shown in FIGS. 4 and 5, the metasurface reflector 30 includes a metal layer 41 (first metal layer), a dielectric layer 42, and a metal layer 43 (second metal layer) in sequence in the Z-axis direction. Although the reflection region 32 is shown in FIGS. 4 and 5, the missing region 33 has the same structure as the reflection region 32 except that the metal layer 43 is not included.

The metal layer 41 is a base layer. The metal layer 41 is provided on the inner surface 3*a* of the lens 3. The metal layer 41 is made of a metal having high reflection characteristics in the visible light region. The metal layer 41 is made of, for example, a metal containing at least one element selected from the group consisting of gold (Au), copper (Cu), silver (Ag), and aluminum (Al). The length (thickness d1) of the metal layer 41 in the Z-axis direction may be any length as long as the metal layer 41 is capable of passing a resonance current and reflecting light. The thickness d1 is, for example, 50 nm to 1000 nm. Hereinafter, the length in the Z-axis direction may be referred to as "thickness".

The dielectric layer 42 is a layer functioning as a spacer. The dielectric layer 42 is provided between the metal layer 41 and the metal layer 43 in the Z-axis direction. In the present embodiment, the dielectric layer 42 is provided on the metal layer 41. The dielectric layer 42 has a main surface 42*a* on which the metal layer 43 is provided. The dielectric layer 42 has a dielectric constant that does not interfere with the electromagnetic action of the metal layer 41 and the metal layer 43. The dielectric layer 42 is made of a material that is transparent in the visible light region. The dielectric layer 42 may be made of a material having a high dielectric constant in order to achieve high reflection characteristics. The dielectric layer 42 is made of, for example, one compound selected from the group consisting of silicon oxides (e.g., $SiO_2$), titanium oxides (e.g., $TiO_2$), magnesium oxides (e.g., MgO), and aluminum oxides (e.g., $Al_2O_3$). The thickness d2 of the dielectric layer 42 is, for example, 10 nm to 100 nm.

The metal layer 43 is a layer for exciting electromagnetic resonance together with the metal layer 41. The metal layer 41 and the metal layer 43 are stacked in the Z-axis direction with the dielectric layer 42 interposed therebetween. In the present embodiment, the metal layer 43 is provided on the main surface 42*a* of the dielectric layer 42. The metal layer 43 is made of a metal having high reflection characteristics in the visible light region. Similarly to the metal layer 41, the metal layer 43 is made of a metal containing at least one element selected from the group consisting of gold (Au), copper (Cu), silver (Ag), and aluminum (Al), for example.

The metal layer 43 includes a metal unit 45. The metal unit 45 is provided in each of some of the unit regions 31 (the reflection regions 32) among the plurality of unit regions 31. The metal unit 45 is configured such that the phase change amount φ of the reflected light Lr by the metal unit 45 changes linearly from one end 32*a* (first end) to the other end 32*b* (second end) in the X-axis direction of the reflection region 32 in which the metal unit 45 is provided. Further, the metal unit 45 is configured such that the phase change amount φ of the reflected light Lr changes substantially by 360° (2π radians) from one end 32*a* to the other end 32*b*. The phase change amount φ of the reflected light Lr is an amount by which the phase of the reflected light Lr from the phase of the reflected light Lr at a certain length of the metal unit 45 in the Y-axis direction changes when the length of the metal unit 45 in the Y-axis direction is changed. Hereinafter, the length in the Y-axis direction may be referred to as "width".

In the present embodiment, the metal unit 45 is a single metal body having a trapezoidal shape when viewed from the Z-axis direction. The thickness d3 of the metal unit 45 is, for example, 10 nm to 100 nm. The length of the metal unit 45 in the X-axis direction is equal to or slightly shorter than the length Lx of the reflection region 32 in the X-axis direction. The length of the metal unit 45 in the X-axis direction is, for example, 500 nm to 2500 nm.

The length (width W1) of the short side of the metal unit 45 is set, for example, to a value close to the resolution of the exposure device used for forming the metal unit 45. The width W1 is, for example, 10 nm to 200 nm. The length (width W2) of the long side of the metal unit 45 is larger than the width W1, and is set to a length that a phase difference of substantially 360° (2π radians) can be obtained from the phase of the reflected light Lr at the width W1. The width W2 is, for example, 100 nm to 500 nm. The metal unit 45 is formed by photolithography, for example.

Figure 6:
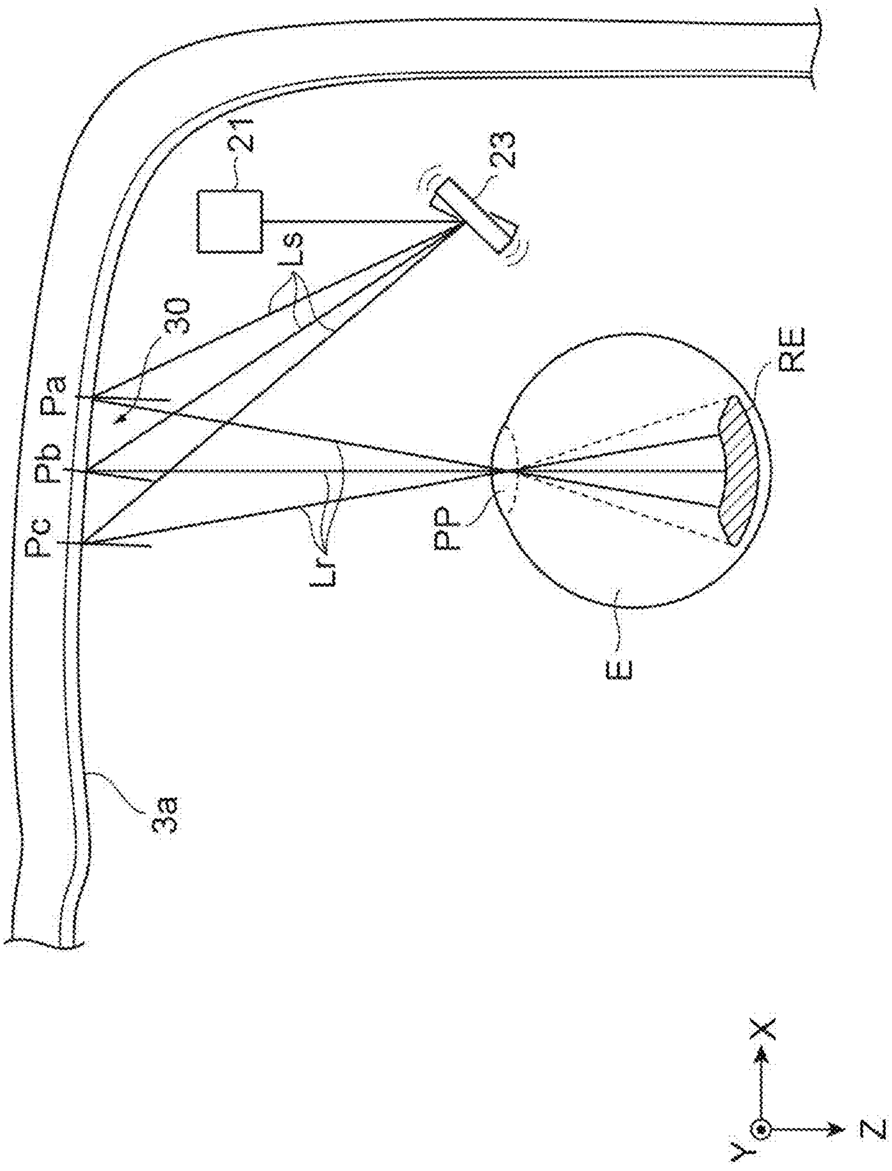
FIG. 6 is a diagram for explaining the principle of reflection by the metasurface reflector shown in FIG. 2.
Figure 7:
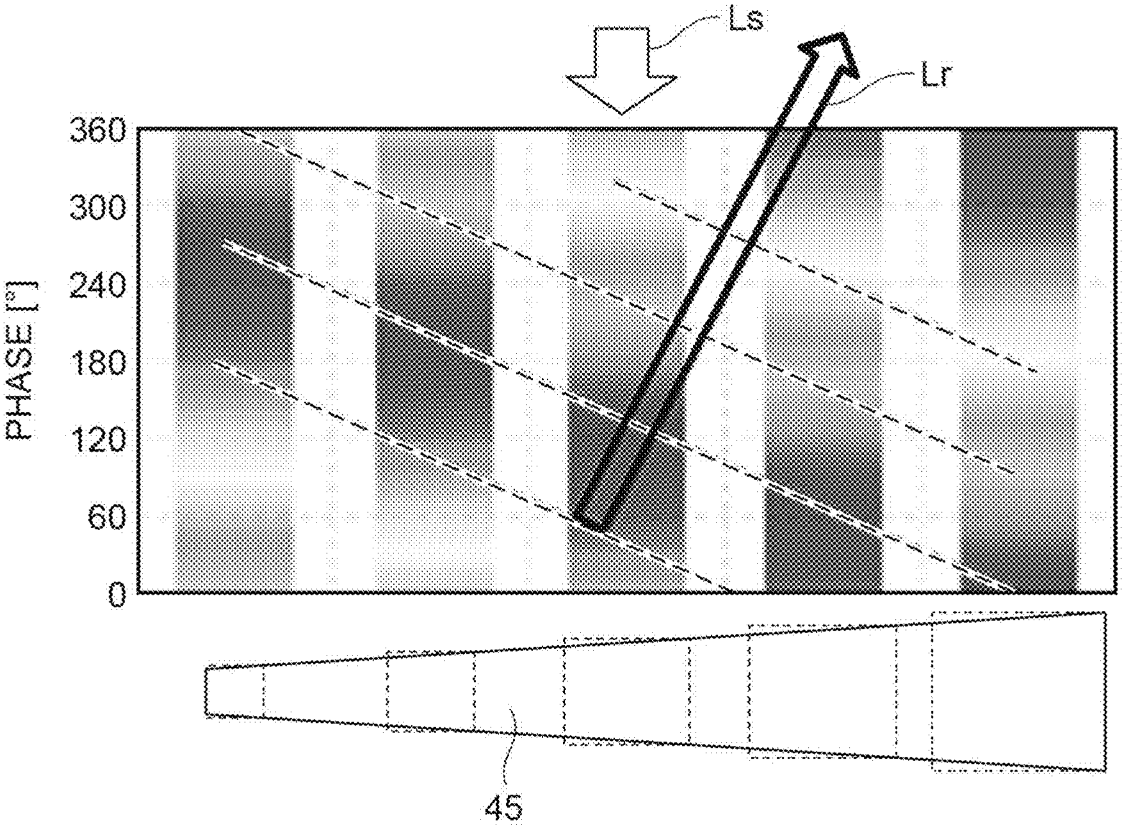
FIG. 7 is a diagram showing the phase change amount of reflected light at the position of the metasurface reflector in the X-axis direction.
Figure 8:
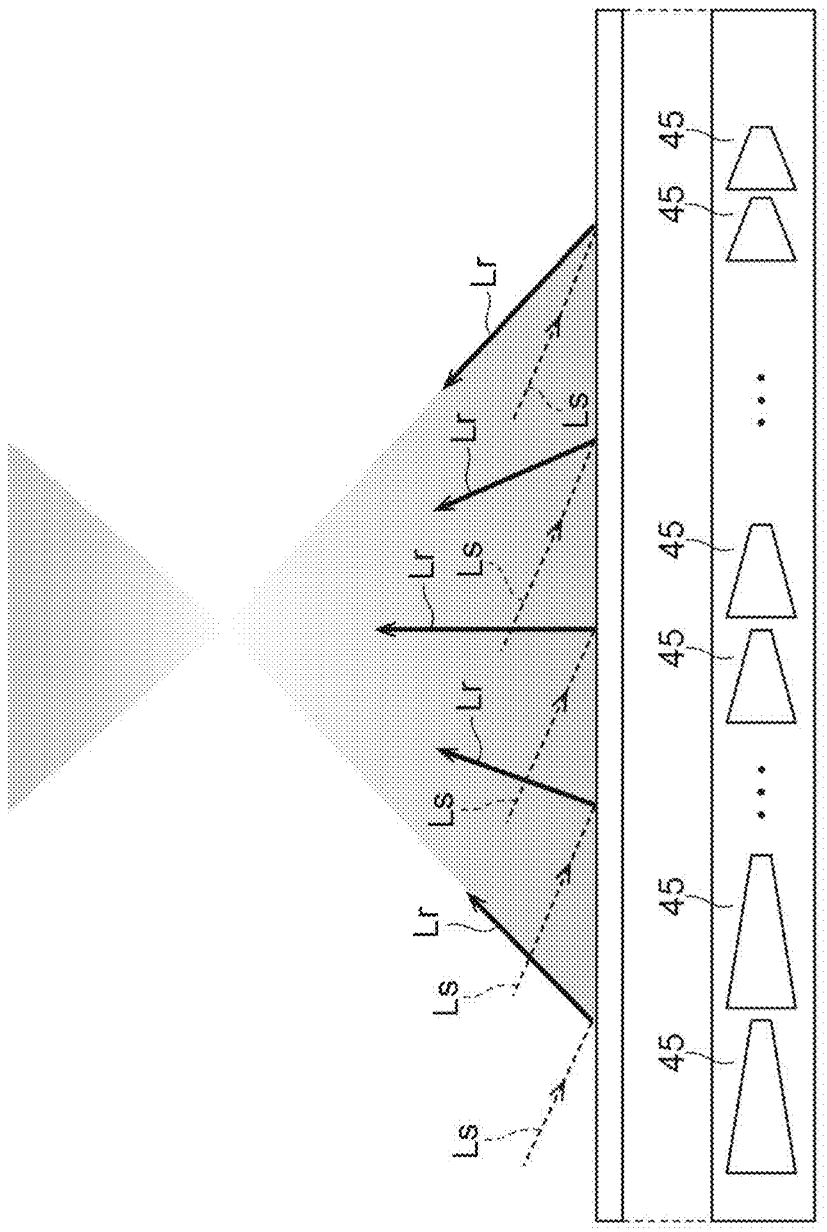
FIG. 8 is a diagram for explaining the relationship between the position in the X-axis direction and the length of the metal unit in the X-axis direction.

Next, a method for determining the length Lx as well as the principle of reflection by the metasurface reflector 30 will be described with reference to FIGS. 5 to 8. FIG. 6 is a diagram for explaining the principle of reflection by the metasurface reflector shown in FIG. 2. FIG. 7 is a diagram showing the phase change amount of reflected light at the position of the metasurface reflector in the X-axis direction. FIG. 8 is a diagram for explaining the relationship between the position in the X-axis direction and the length of the metal unit in the X-axis direction.

As shown in FIGS. 5 and 6, each reflection region 32 is a nanostructure configured to reflect the laser light Ls at a reflection angle $\theta_r$ corresponding to a position where the reflection region 32 is provided when the laser light Ls is incident at an incident angle $\theta_i$ corresponding to the position where the reflection region 32 is provided. The reflection angle $\theta_r$ of each reflection region 32 is set so that the laser light Ls (reflected light Lr) reflected by each reflection region 32 passes through the center of the pupil PP. Therefore, the incident angle $\theta_i$ and the reflection angle $\theta_r$ are determined by the position where the reflection region 32 is provided. The reflection region 32 is configured so that the incident angle $\theta_i$ and the reflection angle $\theta_r$ corresponding to the position where the reflection region 32 is provided are obtained.

Here, the incident angle $\theta_i$ is an angle formed by a normal line of a surface irradiated with the laser light Ls and an incident direction of the laser light Ls. The reflection angle $\theta_r$ is an angle formed by a normal line of a surface irradiated with the laser light Ls and an emission direction of the reflected light Lr. In the plane including the laser light Ls and the reflected light Lr, when the reflected light Lr is emitted on the side opposite to the incident light (laser light Ls) with the normal line as a boundary, the reflection angle $\theta_r$ is expressed by a positive value, and when the reflected light Lr is emitted on the same side as the incident light (laser light Ls) with the normal line as a boundary, the reflection angle $\theta_r$ is expressed by a negative value.

For example, as shown in FIG. 6, when the pupil PP of the user faces the front, the reflection regions 32 provided from the position Pa to the position Pc in the X-axis direction are used. The laser light Ls reflected by the reflection region 32 provided at the position Pa corresponds to a pixel at the right end of the image. The position Pb is in the middle between the position Pa and the position Pc, and the laser light Ls reflected by the reflection region 32 provided at the position Pb corresponds to a pixel in the center of the image. The laser light Ls reflected by the reflection region 32 provided at the position Pc corresponds to a pixel at the left end of the image.

In the reflection region 32 provided at the position Pa, the laser light Ls is incident at an incident angle $\theta_i$ of 30°, and the laser light Ls is reflected at a reflection angle $\theta_r$ of 5° to be emitted as the reflected light Lr. In the reflection region 32 provided at the position Pb, the laser light Ls is incident at an incident angle $\theta_i$ of 40°, and the laser light Ls is reflected at a reflection angle $\theta_r$ of −5° to be emitted as the reflected light Lr. In the reflection region 32 provided at the position Pc, the laser light Ls is incident at an incident angle $\theta_i$ of 50°, and the laser light Ls is reflected at a reflection angle $\theta_r$ of −10° to be emitted as the reflected light Lr.

As shown in FIG. 7, the width of the metal unit 45 increases from the width W1 at the one end 32*a* to the width W2 at the other end 32*b*. The phase change amount φ at each position of the metal unit 45 in the X-axis direction is substantially the same as the phase change amount φ caused by the square metal body having a side having the same length as the width at the position in the plan view. The larger the area of the square metal body in the plan view, the larger the phase change amount φ (phase delay amount) at that position. Accordingly, since the laser light Ls is reflected with different phase change amounts φ in accordance with the position in the X-axis direction, the wave front is formed by the interference between the reflected lights. That is, a plane wave having the gradient of the function φ(x) indicating the relationship between the position x in the X-axis direction and the phase change amount φ as the wave vector Φ is generated.

Here, as shown in FIG. 5, by generalizing the Snell's law, the Snell's law is expressed by Equation (1) using the wave vector $k_0$ of the laser light Ls, the incident angle $\theta_i$, the reflection angle $\theta_r$, and the wave vector Φ.

[Equation 1]

$$k_0 \times \sin\theta_i + \Phi = k_0 \times \sin\theta_r \tag{1}$$

The wave vector $k_0$ is expressed by 2π/λ using the wavelength λ of the laser light Ls. The wave vector Φ is expressed by 2π/Lx using the length Lx of the reflection region 32 in the X-axis direction. By transforming Equation (1) using these relations, Equation (2) is obtained.

[Equation 2]

$$\sin\theta_r = \sin\theta_i + \frac{\lambda}{Lx} \tag{2}$$

The length Lx of the reflection region 32 is obtained by substituting the wavelength λ of the laser light Ls and the incident angle $\theta_i$ and the reflection angle $\theta_r$ of the laser light Ls corresponding to the position where the reflection region 32 is provided into Equation (2). The laser light Ls contains a red component, a green component, and a blue component, but the length Lx is determined using, for example, the wavelength of the green component, to which the human eyes have the highest sensitivity, as the wavelength λ.

When the length Lx is a positive value, the shape of the metal unit 45 is set to a trapezoidal shape in which the width of the metal unit 45 increases from one end 32*a* to the other end 32*b*. When the length Lx is a negative value, the shape of the metal unit 45 is set to a trapezoidal shape in which the width of the metal unit 45 decreases from one end 32*a* to the other end 32*b*.

The length Lx of the missing region 33 in the X-axis direction is obtained by substituting the wavelength λ of the laser light Ls, and the incident angle $\theta_i$ and the reflection angle $\theta_r$ of the laser light Ls corresponding to the position where the missing region 33 is provided when the missing region 33 is assumed to be the reflection region 32 into Equation (2).

As described above, the length Lx of each unit region 31 is determined by the wavelength λ to be reflected, and the incident angle $\theta_i$ and the reflection angle $\theta_r$ corresponding to the position where the unit region 31 is provided. The length of the metal unit 45 in the X-axis direction is equal to or slightly shorter than the length Lx of the reflection region 32 in the X-axis direction. Accordingly, the length of the metal unit 45 in the X-axis direction is determined by the wavelength A to be reflected, and the incident angle $\theta_i$ and the reflection angle $\theta_r$ corresponding to the position of the reflection region 32 where the metal unit 45 is provided.

When the reflection angle $\theta_r$ is smaller than the incident angle $\theta_i$, the length Lx becomes a negative value. As the difference between the incident angle $\theta_i$ and the reflection angle $\theta_r$ increases, the absolute value of the length Lx decreases. As shown in FIG. 8, in the near-eye wearable device 1, as the distance from the movable mirror 23 increases, the reflection angle $\theta_r$ decreases, and the difference between the incident angle $\theta_i$ and the reflection angle $\theta_r$ increases, so that the length Lx also decreases. Accordingly, the lengths Lx of the unit regions 31 included in the same row are different from each other, and the lengths in the X-axis direction of the metal units 45 included in the same row are also different from each other.

Note that the length Ly of each unit region 31 is a predetermined fixed value. The length Ly is slightly larger than the width W2. The length Ly may be a length obtained by adding the resolution (for example, 100 nm) of the exposure device used for forming the metal unit 45 to the width W2, and is set to, for example, 600 nm. The width W1 and the width W2 of each metal unit 45 are predetermined fixed values. As described above, the width W1 is set to a value close to the resolution (for example, 100 nm) of the exposure device used for forming the metal unit 45. The width W2 is set to a length (for example, 350 nm) at which a phase difference of substantially 360° (2π radians) can be obtained from the phase of the reflected light Lr at the width W1.

Figure 9:
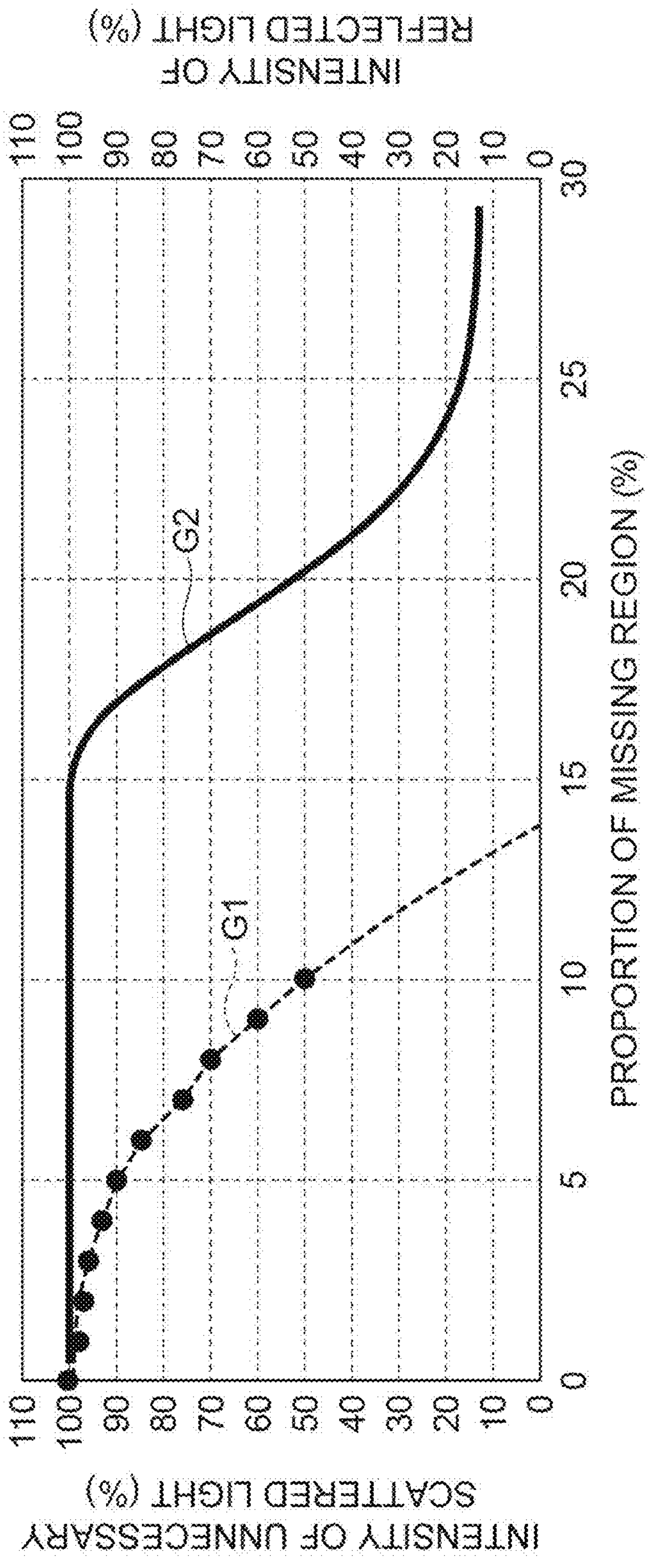
FIG. 9 is a diagram showing the relationship between the proportion of the missing regions and the intensity of the unnecessary scattered light and the intensity of the reflected light.

Next, the influence of the missing region 33 on the intensity of the unnecessary scattered light and the intensity of the reflected light will be described with reference to FIG. 9. FIG. 9 is a diagram showing the relationship between the proportion of the missing regions and the intensity of the unnecessary scattered light and the intensity of the reflected light. The horizontal axis of FIG. 9 indicates the proportion (unit: %) of the missing regions 33 to all the unit regions 31 included in the metasurface reflector 30. The vertical axis on the left side of FIG. 9 indicates the intensity of the unnecessary scattered light. The vertical axis on the right side of FIG. 9 indicates the intensity of the reflected light. The intensity of the unnecessary scattered light is expressed as a percentage (unit: %) relative to the intensity of the unnecessary scattered light when all the unit regions 31 included in the metasurface reflector 30 are the reflection regions 32. The intensity of the reflected light is expressed as a percentage (unit: %) relative to the intensity of the incident light. The graph G1 is a graph showing the relationship between the proportion of the missing regions 33 and the intensity of the unnecessary scattered light. The graph G2 is a graph showing the relationship between the proportion of the missing regions 33 and the intensity of the reflected light. The graphs G1 and G2 were obtained by actual measurement.

As shown in FIG. 9, the intensity of the unnecessary scattered light decreases exponentially as the proportion of the missing regions 33 increases. When the proportion of the missing regions 33 is 10% or more, the intensity of the unnecessary scattered light is 50% or less. On the other hand, the intensity of the reflected light hardly decreases from 100% when the proportion of the missing regions 33 is about 15% or less, but starts to decrease when the proportion of the missing regions 33 exceeds 15%. If the proportion of the missing regions 33 is 20% or less, the intensity of the reflected light is 50% or more. From the above, it can be understood that the intensity of the unnecessary scattered light is suppressed to 50% or less and the intensity of the reflected light is maintained at 50% or more when the proportion of the missing regions 33 is in the range of 10% to 20%.

Next, a method of manufacturing the near-eye wearable device 1 will be described. First, the lens 3 is prepared and set in a vacuum film deposition device. Then, the metal layer 41 is formed in a desired area on the inner surface 3*a* of the lens 3. Specifically, the metal layer 41 is formed by vacuum film deposition using a technique such as a direct current (DC) sputtering. For forming the metal layer 41, a metal material composed of any metal selected from a group consisting of gold (Au), copper (Cu), silver (Ag), and aluminum (Al) or a metal alloy containing at least one element selected from the above-described group is used.

Subsequently, the dielectric layer 42 is formed on the metal layer 41. Specifically, the dielectric layer 42 is formed by vacuum film deposition using a technique such as a radio frequency (RF) sputtering. For forming the dielectric layer 42, a dielectric material such as silicon dioxide ($SiO_2$), titanium oxide ($TiO_2$), magnesium oxide (MgO) or aluminum oxide ($Al_2O_3$) which can be formed by a semiconductor process is used.

Subsequently, a metal layer (hereinafter referred to as an "outermost metal layer") which is a base of the metal layer 43 is formed on the dielectric layer 42. Since the method of forming the outermost metal layer is the same as that of the metal layer 41, a detailed description thereof will be omitted.

Subsequently, the metal layer 43 (the plurality of metal units 45) is formed by a photolithography process and an etching process.

Specifically, a liquid resist is applied onto the outermost metal layer using a spin coater or the like, and the applied liquid resist is dried to form a resist film (photoresist). Then, a pattern corresponding to the metal units 45 is transferred onto the resist film using an exposure device such as a KrF exposure device and an electron beam lithography device. Then, the pattern transferred to the resist film is developed using a developing machine. Then, a portion of the outermost metal layer not covered with the pattern is removed by ion milling, and then the resist film is removed. Thus, the metal layer 43 is formed. As described above, the metasurface reflector 30 is formed on the inner surface 3*a* of the lens 3.

Subsequently, the frame 2 on which the optical engine 20 is mounted is prepared, and the lens 3 on which the metasurface reflector 30 is formed is mounted on the rim 2*a* of the frame 2. As described above, the near-eye wearable device 1 is manufactured.

The metasurface reflector 30 is not required to be directly formed on the inner surface 3*a* of the lens 3. For example, the metasurface reflector 30 may be formed on a base material such as a sapphire substrate or a flexible sheet. The method of forming the metasurface reflector 30 on the base material is the same as the method of forming the metasurface reflector 30 on the lens 3. In this case, a plurality of metasurface reflectors 30 may be formed on the base material. Then, by cutting the base material, a portion including one metasurface reflector 30 is obtained. The metasurface reflector 30 is formed on the inner surface 3*a* of the lens 3 by attaching the portion of the base material to a predetermined area of the inner surface 3*a* of the lens 3.

In the near-eye wearable device 1, the projection device 10, and the metasurface reflector 30 described above, the metasurface reflector 30 is divided into the plurality of unit regions 31 arranged in the X-axis direction along the main surface 42*a* and in the Y-axis direction along the main surface 42*a* and intersecting (orthogonal to) the X-axis direction, and the metal unit 45 is provided in each reflection region 32 among the plurality of unit regions 31. All the metal units 45 are set for the same wavelength λ. The lengths in the X-axis direction of the metal units 45 included in one arrangement in the X-axis direction (that is, one row) are different from each other.

For example, in the case where the lengths in the X-axis direction of the metal units 45 provided in the reflection regions 32 within a certain range are the same, the metal units 45 having the same length in the X-axis direction are arranged, so that the periodicity of the metal units 45 occurs in the X-axis direction. On the other hand, in the near-eye wearable device 1, the projection device 10, and the metasurface reflector 30 described above, the metal units 45 having different lengths in the X-axis direction are arranged, so that the periodicity of the metal units 45 is less likely to occur in the X-axis direction. This makes it possible to reduce the possibility of generating unnecessary scattered light in the X-axis direction. As a result, unnecessary scattered light can be reduced.

For example, it is conceivable to make the lengths of the metal units 45 in the X-axis direction, which are provided in the reflection regions 32 within a single range, the same for each predetermined range. In this case, within the same range, the metal units 45 having the same length in the X-axis direction are arranged, and the reflection angles $\theta_r$ of the reflected light Lr reflected by the metal units 45 are substantially the same. Accordingly, a large change occurs in the reflection angle $\theta_r$ between the two adjacent ranges, and there is a possibility that light bleeding occurs when the reflected light Lr is combined.

On the other hand, in the near-eye wearable device 1, the projection device 10, and the metasurface reflector 30 described above, each metal unit 45 is configured such that the phase change amount φ of the reflected light Lr linearly changes from one end 32*a* to the other end 32*b* of the reflection region 32 where the metal unit 45 is provided. According to this configuration, a plane wave having the gradient of the function φ(x) indicating the relationship between the position x in the X-axis direction and the phase change amount φ of the reflected light Lr as the wave vector Φ is generated. In this case, since Equations (1) and (2) are satisfied, the length of the metal unit 45 in the X-axis direction is determined by the wavelength λ to be reflected, the incident angle $\theta_i$ and the reflection angle $\theta_r$ corresponding to the position of the reflection region 32 where the metal unit 45 is provided. Therefore, by adjusting the length of the metal unit 45 in the X-axis direction, a desired reflection angle $\theta_r$ can be obtained with respect to the incident angle $\theta_i$ corresponding to the position of the reflection region 32. Accordingly, since the reflection angles $\theta_r$ smoothly change in the X-axis direction, it is possible to suppress the light bleeding.

In the arrangement in the Y-axis direction, the reflection regions 32 and the missing regions 33 are arranged irregularly. Therefore, the metal units 45 are arranged irregularly in the Y-axis direction. Accordingly, since the periodicity of the metal units 45 is less likely to occur in the Y-axis direction, it is possible to reduce the possibility that unnecessary scattered light occurs in the Y-axis direction. As a result, unnecessary scattered light can be further reduced.

The number of missing regions 33 is 10% or more and 20% or less of the total number of unit regions 31 included in the metasurface reflector 30. This configuration makes it possible to reduce unnecessary scattered light while suppressing a decrease in the intensity of reflected light.

The metal unit 45 is a metal body having a trapezoidal shape when viewed from the Z-axis direction. Therefore, the structure of the metal unit 45 can be simplified as compared with the case where the metal unit is composed of a plurality of metal bodies. Accordingly, the manufacturing of the metasurface reflector 30 can be facilitated.

When the length of the metal unit 45 in the X-axis direction is 500 nm or more and 2500 nm or less, the reflected light Lr corresponding to a viewing angle of 40° to 60° can be obtained. When the thickness d3 is 10 nm or more and 100 nm or less, the electromagnetic resonance with the metal layer 41 through the dielectric layer 42 is effectively generated, and the reflected light Lr having a strong electric field strength can be obtained. When the width W1 is 10 nm or more and 200 nm or less and the width W2 is 100 nm or more and 500 nm or less, the phase difference between the phase of the reflected light Lr at the width W1 and the phase of the reflected light Lr at the width W2 can be set to 360° (2π radians) for the laser light Ls of the visible light. As described above, by setting the respective dimensions of the metal unit 45 within the above-described ranges, the reflection efficiency for visible light can be enhanced.

The metal layer 43 is made of a metal containing at least one element selected from the group consisting of silver, aluminum, copper, and gold. Therefore, the metal layer 43 having a relatively high reflectance in the visible light region and a relatively high electric conductivity is obtained. Accordingly, the electromagnetic resonance between the metal layer 41 and the metal layer 43 can be strengthened, and the reflection efficiency can be enhanced.

The dielectric layer 42 is made of a material transparent in the visible light region. Accordingly, the absorption rate of visible light in the dielectric layer 42 is suppressed, so that the reflection efficiency for visible light can be enhanced.

The dielectric layer 42 is made of, for example, one compound selected from the group consisting of silicon oxide, titanium oxide, magnesium oxide, and aluminum oxide. In this case, the dielectric layer 42 having a dielectric constant that does not interfere with the electromagnetic action is obtained. Accordingly, the electromagnetic resonance between the metal layer 41 and the metal layer 43 can be strengthened, and the reflection efficiency can be enhanced.

The thickness d1 is, for example, 50 nm or more and 1000 nm or less. The thickness d2 is, for example, 10 nm or more and 100 nm or less. In this case, the possibility that the dielectric layer 42 interferes with the electromagnetic action can be reduced, and the possibility that the laser light Ls passes through the metal layer 41 can be reduced. Accordingly, the reflection efficiency can be enhanced.

The metasurface reflector, the projection device, and the near-eye wearable device according to the present disclosure are not limited to the above-described embodiments.

The near-eye wearable device 1 may be virtual reality (VR) glasses.

In the above-described embodiments, the projection device 10 directly projects (draws) an image onto the retina RE of the user of the near-eye wearable device 1. The projection device 10 may project an image onto the metasurface reflector 30.

The metasurface reflector 30 may be applied to devices other than the projection device 10. For example, the metasurface reflector 30 may be applied to a general image projection surface such as an image screen.

The plurality of unit regions 31 is not required to include any missing region 33. In other words, the metal unit 45 may be provided in each of all the unit regions 31 among the plurality of unit regions 31. In this case as well, the lengths in the X-axis direction of the metal units 45 included in one arrangement (that is, one row) in the X-axis direction are different from each other. Accordingly, since the periodicity of the metal units 45 is less likely to occur in the X-axis direction, it is possible to reduce the possibility that unnecessary scattered light occurs in the X-axis direction.

Figure 10:
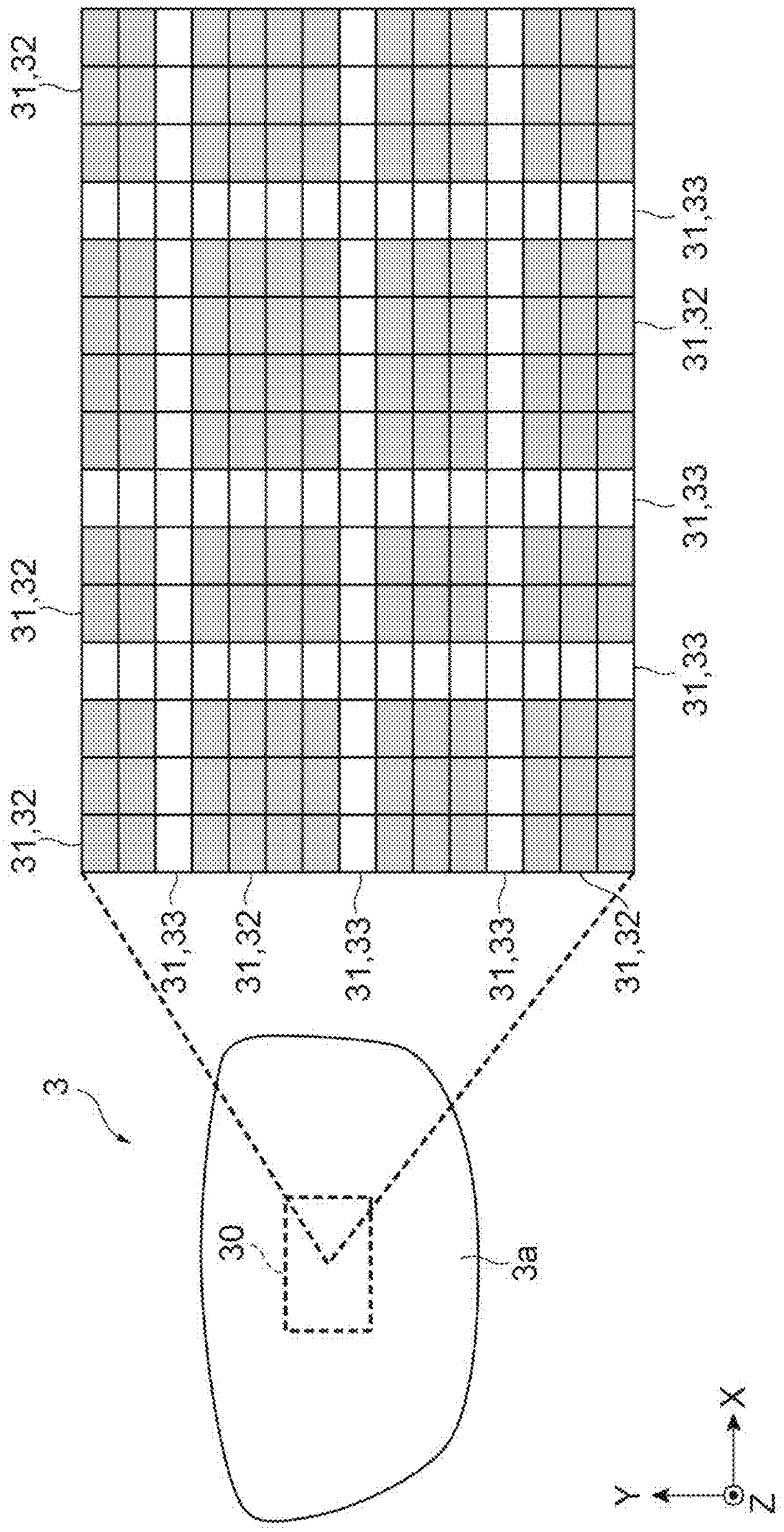
FIG. 10 is a plan view schematically showing another example of the metasurface reflector shown in FIG. 2.

As shown in FIG. 10, in the arrangement in the X-axis direction as well, the reflection regions 32 and the missing regions 33 may be arranged irregularly. In other words, in the arrangement in the X-axis direction, the reflection regions 32 and the missing regions 33 are distributed in a non-uniform sequence. In this case as well, the number of missing regions 33 is, for example, 10% to 20% of the total number of unit regions 31 included in the metasurface reflector 30. In the example shown in FIG. 10, all the unit regions 31 in one column are set either as the reflection regions 32 or the missing regions 33. For example, the column of the column number corresponding to the random value obtained by the random function is determined as the column of the missing regions 33. According to the configuration in which the reflection regions 32 and the missing regions 33 are arranged irregularly in the arrangement in the X-axis direction, the metal units 45 are arranged irregularly in the X-axis direction. Accordingly, since the periodicity of the metal units 45 in the X-axis direction is even less likely to occur, it is possible to further reduce the possibility that unnecessary scattered light occurs in the X-axis direction. In this case as well, by setting the number of missing regions 33 to 10% or more and 20% or less of the total number of unit regions 31 included in the metasurface reflector 30, it is possible to reduce unnecessary scattered light while suppressing a decrease in the intensity of reflected light.

Figure 11:
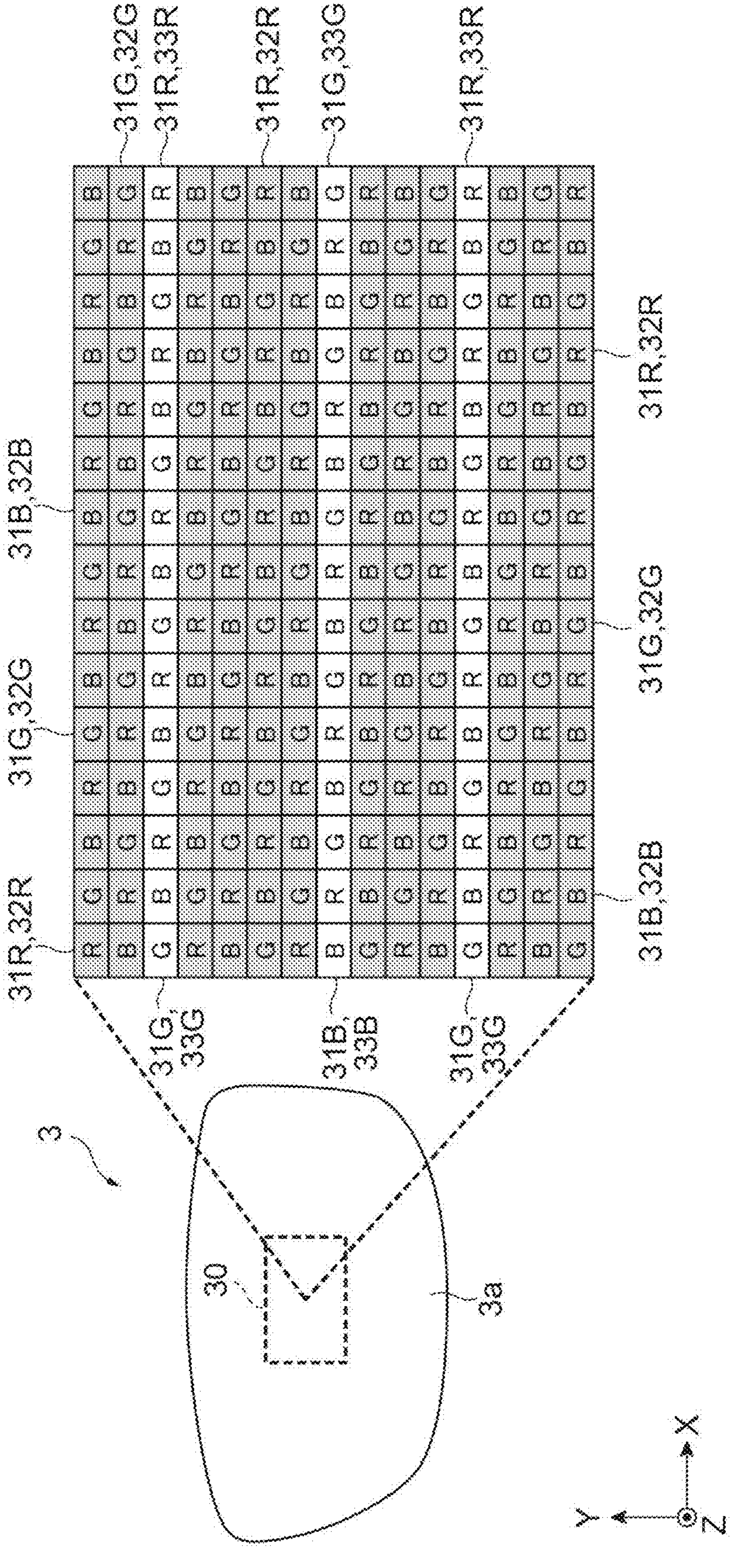
FIG. 11 is a plan view schematically showing still another example of the metasurface reflector shown in FIG. 2.

As shown in FIG. 11, the plurality of unit regions 31 may include unit regions 31R for the red component (first unit regions), unit regions 31G for the green component (second unit regions), and unit regions 31B for the blue component (third unit regions). In the X-axis direction, the unit region 31R, the unit region 31G, and the unit region 31B are repeatedly arranged in that order. In the Y-axis direction as well, the unit region 31R, the unit region 31G, and the unit region 31B are repeatedly arranged in that order.

The plurality of unit regions 31R includes reflection regions 32R and missing regions 33R. Each of the reflection regions 32R is a unit region 31R in which the metal unit 45 is provided. Each of the missing regions 33R is a unit region 31R in which any metal unit 45 is not provided. The plurality of unit regions 31G includes reflection regions 32G and missing regions 33G. Each of the reflection regions 32G is a unit region 31G in which the metal unit 45 is provided. Each of the missing regions 33G is a unit region 31G in which any metal unit 45 is not provided. The plurality of unit regions 31B includes reflection regions 32B and missing regions 33B. Each of the reflection regions 32B is a unit region 31B in which the metal unit 45 is provided. Each of the missing regions 33B is a unit region 31B in which any metal unit 45 is not provided.

As in the example shown in FIG. 3, in the arrangement in the Y-axis direction, the reflection regions 32R, 32G, and 32B and the missing regions 33R, 33G, and 33B may be arranged irregularly. The total number of missing regions 33R, 33G, and 33B is, for example, 10% to 20% of the total number of unit regions 31 included in the metasurface reflector 30. In the example shown in FIG. 11, the row of the row number corresponding to the random value obtained by the random function are determined as the row of the missing regions 33R, 33G, and 33B. Similarly to the example shown in FIG. 10, in the arrangement in the X-axis direction as well, the reflection regions 32R, 32G, and 32B and the missing regions 33R, 33G, and 33B may be arranged irregularly.

In this modification example as well, the reflection regions 32R, 32G, and 32B are configured so that the incident angles $\theta_i$ and the reflection angles $\theta_r$ corresponding to the positions where the reflection regions 32R, 32G, and 32B are provided are obtained. Accordingly, the lengths in the X-axis direction of the metal units 45 provided in the unit regions 31R (reflection regions 32R) included in one row are different from each other. Similarly, the lengths in the X-axis direction of the metal units 45 provided in the unit regions 31G (reflection regions 32G) included in one row are different from each other. The lengths in the X-axis direction of the metal units 45 provided in the unit regions 31B (reflection regions 32B) included in one row are different from each other.

The reflection angle $\theta_r$ by the metal unit 45 varies in accordance with the wavelength λ. Therefore, the laser light Ls having the red component, the green component, and the blue component may not be reflected at a desired reflection angle $\theta_r$. In the configuration of the above modification example, since the unit regions 31R for the red component, the unit regions 31G for the green component, and the unit regions 31B for the blue component are provided, each component can be reflected at the desired reflection angle $\theta_r$. Further, since the lengths of the metal units 45 for the same wavelength component in the X-axis direction are different from each other, the periodicity of the metal units 45 in the X-axis direction is less likely to occur. Accordingly, it is possible to reduce the possibility that unnecessary scattered light occurs in the X-axis direction. As a result, it is possible to reflect each component of the laser light Ls at the desired reflection angle $\theta_r$ while reducing unnecessary scattered light.

The method for determining the length Lx is not limited to the method described in the above-described embodiments. For example, the lengths Lx of the unit regions 31 located at both ends of the metasurface reflector 30 in the X-axis direction may be determined by the above-described method, and the lengths Lx of the unit regions 31 located therebetween may be determined so as to gradually change from the length Lx of the unit region 31 located at one end of the metasurface reflector 30 in the X-axis direction to the length Lx of the unit region 31 located at the other end thereof.

The metal unit 45 is not limited to one metal body having a trapezoidal shape, and may be composed of, for example, a plurality of metal bodies arranged in the X-axis direction.

Additional Statements

[Clause 1]

A metasurface reflector comprising:

a first metal layer and a second metal layer stacked in a first direction; and a dielectric layer provided between the first metal layer and the second metal layer in the first direction, the dielectric layer including a main surface on which the second metal layer is provided, wherein the metasurface reflector is divided into a plurality of unit regions arranged in a second direction along the main surface and in a third direction along the main surface and intersecting the second direction, wherein the second metal layer includes metal units respectively provided in all or some of the plurality of unit regions, and wherein lengths of metal units, which are arranged in the second direction and set for a same wavelength among the metal units, in the second direction are different from each other.

[Clause 2]

The metasurface reflector according to clause 1, wherein each metal unit of the metal units is configured such that a phase change amount of reflected light linearly changes from a first end to a second end in the second direction of a unit region in which the metal unit is provided, and wherein a length of the metal unit in the second direction is determined by a wavelength to be reflected, and an incident angle and a reflection angle corresponding to a position of the unit region in which the metal unit is provided.

[Clause 3]

The metasurface reflector according to clause 1 or 2, wherein each of the metal units is a metal body having a trapezoidal shape when viewed from the first direction.

[Clause 4]

The metasurface reflector according to clause 3, wherein a length of the metal body in the second direction is 500 nm or more and 2500 nm or less, wherein a length of the metal body in the first direction is 10 nm or more and 100 nm or less, wherein a length of a short side of the metal body is 10 nm or more and 200 nm or less, and wherein a length of a long side of the metal body is larger than the length of the short side and is 100 nm or more and 500 nm or less.

[Clause 5]

The metasurface reflector according to any one of clauses 1 to 4, wherein the plurality of unit regions includes reflection regions each provided with one of the metal units and missing regions each without any metal unit, and wherein the reflection regions and the missing regions are arranged irregularly in an arrangement in the third direction.

[Clause 6]

The metasurface reflector according to clause 5, wherein the reflection regions and the missing regions are arranged irregularly in an arrangement in the second direction.

[Clause 7]

The metasurface reflector according to clause 5 or 6, wherein a number of the missing regions is 10% or more and 20% or less of a total number of unit regions included in the metasurface reflector.

[Clause 8]

The metasurface reflector according to any one of clauses 1 to 7, wherein the plurality of unit regions includes first unit regions for a red component, second unit regions for a green component, and third unit regions for a blue component, wherein the first unit regions, the second unit regions, and the third unit regions are arranged repeatedly one by one in that order in the second direction and the third direction, wherein lengths of the metal units, which are provided in the first unit regions arranged in the second direction, in the second direction are different from each other, wherein lengths of the metal units, which are provided in the second unit regions arranged in the second direction, in the second direction are different from each other, and wherein lengths of the metal units, which are provided in the third unit regions arranged in the second direction, in the second direction are different from each other.

[Clause 9]

The metasurface reflector according to any one of clauses 1 to 8, wherein the second metal layer is made of a metal containing at least one element selected from a group consisting of silver, aluminum, copper, and gold.

[Clause 10]

The metasurface reflector according to any one of clauses 1 to 9, wherein the dielectric layer is made of a material transparent in a visible light region.

[Clause 11]

The metasurface reflector according to clause 10, wherein the dielectric layer is made of a compound selected from a group consisting of silicon oxide, titanium oxide, magnesium oxide, and aluminum oxide.

[Clause 12]

The metasurface reflector according to any one of clauses 1 to 11, wherein a length of the dielectric layer in the first direction is 10 nm or more and 100 nm or less, and wherein a length of the first metal layer in the first direction is 50 nm or more and 1000 nm or less.

[Clause 13]

A projection device mounted on a near-eye wearable device, the projection device comprising:

a light source configured to emit laser light;

a movable mirror configured to perform scanning with the laser light; and the metasurface reflector according to any one of clauses 1 to 12, the metasurface reflector configured to reflect the laser light that has passed through the movable mirror to cause a user wearing the near-eye wearable device to visually recognize an image.

[Clause 14]

A near-eye wearable device comprising:

the projection device according to clause 13; and a lens provided with the metasurface reflector.

What is claimed is:

1. A metasurface reflector comprising:

a first metal layer and a second metal layer stacked in a first direction; and a dielectric layer provided between the first metal layer and the second metal layer in the first direction, the dielectric layer including a main surface on which the second metal layer is provided, wherein the metasurface reflector is divided into a plurality of unit regions arranged in a second direction along the main surface and in a third direction along the main surface and intersecting the second direction, wherein the second metal layer includes metal units respectively provided in all or some of the plurality of unit regions, and wherein lengths of metal units, which are arranged in the second direction and set for a same wavelength among the metal units, in the second direction are different from each other.

2. The metasurface reflector according to claim 1, wherein each metal unit of the metal units is configured such that a phase change amount of reflected light linearly changes from a first end to a second end in the second direction of a unit region in which the metal unit is provided, and wherein a length of the metal unit in the second direction is determined by a wavelength to be reflected, and an incident angle and a reflection angle corresponding to a position of the unit region in which the metal unit is provided.

3. The metasurface reflector according to claim 1, wherein each of the metal units is a metal body having a trapezoidal shape when viewed from the first direction.

4. The metasurface reflector according to claim 3, wherein a length of the metal body in the second direction is 500 nm or more and 2500 nm or less, wherein a length of the metal body in the first direction is 10 nm or more and 100 nm or less, wherein a length of a short side of the metal body is 10 nm or more and 200 nm or less, and wherein a length of a long side of the metal body is larger than the length of the short side and is 100 nm or more and 500 nm or less.

5. The metasurface reflector according to claim 1, wherein the plurality of unit regions includes reflection regions each provided with one of the metal units and missing regions each without any metal unit, and wherein the reflection regions and the missing regions are arranged irregularly in an arrangement in the third direction.

6. The metasurface reflector according to claim 5, wherein the reflection regions and the missing regions are arranged irregularly in an arrangement in the second direction.

7. The metasurface reflector according to claim 5, wherein a number of the missing regions is 10% or more and 20% or less of a total number of unit regions included in the metasurface reflector.

8. The metasurface reflector according to claim 1, wherein the plurality of unit regions includes first unit regions for a red component, second unit regions for a green component, and third unit regions for a blue component, wherein the first unit regions, the second unit regions, and the third unit regions are arranged repeatedly one by one in that order in the second direction and the third direction, wherein lengths of the metal units, which are provided in the first unit regions arranged in the second direction, in the second direction are different from each other, wherein lengths of the metal units, which are provided in the second unit regions arranged in the second direction, in the second direction are different from each other, and wherein lengths of the metal units, which are provided in the third unit regions arranged in the second direction, in the second direction are different from each other.

9. The metasurface reflector according to claim 1, wherein the second metal layer is made of a metal containing at least one element selected from a group consisting of silver, aluminum, copper, and gold.

10. The metasurface reflector according to claim 1, wherein the dielectric layer is made of a material transparent in a visible light region.

11. The metasurface reflector according to claim 10, wherein the dielectric layer is made of a compound selected from a group consisting of silicon oxide, titanium oxide, magnesium oxide, and aluminum oxide.

12. The metasurface reflector according to claim 1, wherein a length of the dielectric layer in the first direction is 10 nm or more and 100 nm or less, and wherein a length of the first metal layer in the first direction is 50 nm or more and 1000 nm or less.

13. A projection device mounted on a near-eye wearable device, the projection device comprising:

a light source configured to emit laser light;

a movable mirror configured to perform scanning with the laser light; and the metasurface reflector according to claim 1, the metasurface reflector configured to reflect the laser light that has passed through the movable mirror to cause a user wearing the near-eye wearable device to visually recognize an image.

14. A near-eye wearable device comprising:

the projection device according to claim 13; and a lens provided with the metasurface reflector.

* * * * *